United States Patent [19]

Lasky

[11] Patent Number: 5,716,517
[45] Date of Patent: Feb. 10, 1998

[54] FILTER ASSEMBLY INCLUDING A MAGNETIZED COMPONENT

[75] Inventor: William Marc Lasky, Charlotte, N.C.

[73] Assignee: Dana Corporation, Toledo, Ohio

[21] Appl. No.: 580,704

[22] Filed: Dec. 29, 1995

[51] Int. Cl.$^6$ .................................................. B01D 35/06
[52] U.S. Cl. ...................... 210/130; 210/136; 210/223; 210/444; 210/453
[58] Field of Search ........................ 210/130, 136, 210/223, 440, 322, 443, 352, 444, 453; 184/6.25

[56] References Cited

U.S. PATENT DOCUMENTS

| | | | |
|---|---|---|---|
| 2,307,954 | 1/1943 | Radke | 210/170 |
| 2,459,534 | 1/1949 | Kennedy | 210/1.5 |
| 2,721,659 | 10/1955 | Turcotte | 210/1.5 |
| 2,893,561 | 7/1959 | Duzich | 210/223 |
| 2,926,787 | 3/1960 | Combest | 210/223 |
| 2,936,893 | 5/1960 | Arkoosh et al. | 210/223 |
| 2,980,257 | 4/1961 | Paton | 210/223 |
| 3,342,339 | 9/1967 | Riolo | 210/223 |
| 3,460,679 | 8/1969 | Llewellyn | 210/222 |
| 3,480,145 | 11/1969 | Gladden | 210/223 |
| 3,727,761 | 4/1973 | Aspinwall et al. | 210/223 |
| 3,890,232 | 6/1975 | Combest et al. | 210/223 |
| 4,218,320 | 8/1980 | Liaw | 210/223 |
| 4,446,019 | 5/1984 | Robinson | 210/223 |
| 4,629,558 | 12/1986 | Garrity | 210/223 |
| 4,894,153 | 1/1990 | Shirdavani | 210/222 |
| 5,078,871 | 1/1992 | McCready | 210/222 |
| 5,250,176 | 10/1993 | Daniel | 210/130 |
| 5,354,462 | 10/1994 | Perritt | 210/223 |

*Primary Examiner*—Matthew O. Savage
*Attorney, Agent, or Firm*—Millen, White, Zelano, & Branigan, P.C.

[57] ABSTRACT

A filter element has an internal coil spring which is magnetized to remove magnetizable particles from a stream of lubricating oil prior to the oil passing through an annular filter media. The annular filter media is part of a cylindrical filter element which includes an end cap that closes one end of the filter element and an internal sleeve which defines a hollow core. The filter element is disposed within a filter container having a cylindrical wall and a round end wall. The filter container is closed at one end by an end plate overlain by a cover plate. Lubricating oil to be filtered enters the container and accumulates in an annular space between the filter element and in an end space between the end cap of the filter element and the closed end of the housing prior to passing through the filter media. By being positioned in the end space, the coil spring exposes the lubricating oil to its magnetic field so as to remove magnetizable particles entrained in the oil from the oil and to retain those particles on the coil spring.

8 Claims, 1 Drawing Sheet

FILTER ASSEMBLY INCLUDING A MAGNETIZED COMPONENT

FIELD OF THE INVENTION

The present invention is directed to a filter assembly including a magnetized component. More particularly, the present invention is directed to extraction of magnetizable metallic particles from liquids such as engine lubricating oil and the like.

BACKGROUND OF THE INVENTION

As internal combustion engines operate, fine iron particles are dislodged from piston rings, cylinder walls and other surfaces. These particles become entrained in lubricating oil and are frequently small enough to pass through filter media. Upon re-entering the engine, these particles occasionally cause additional abrasion which, of course, dislodges more particles into the lubricating stream. As iron particles accumulate, the chance that surfaces will abrade accelerates since an increase in the number of abrasions result in additional iron particles which in turn generate even more abrasion. Iron particles act in concert with acid, dirt and products of combustion to cause wear which decreases engine life and increases the expense of operating internal combustion engines.

In order to remove iron particles from circulating lubricating oil and other circulating liquids, many attempts have been made to incorporate magnetized components in or on liquid filter assemblies. As is evident from the lack of commercial availability of such devices, commercial acceptance of removing iron particles from lubricating streams by magnetized filter assembly components has not occurred.

In view of the aforementioned considerations, there is a need for such structures includable in filter assemblies, especially filter assemblies for filtering the lubricating oil of internal combustion engines.

SUMMARY OF THE INVENTION

In view of the aforementioned considerations, it is a feature of the present invention to provide a new and improved filter having the capacity to remove magnetizable particles from a stream of liquid being filtered.

In view of this feature and other features, the present invention is directed to a filter assembly comprised of a cylindrical filter element, including an annular filter media which is disposed within a filter container closed by an end plate, which end plate is retained in place by a cover plate crimped to the housing, the cylindrical filter element being urged by a coil spring against a relief valve assembly. The end plate has an outlet opening, coaxial with the axis of the filter assembly, and a plurality of inlet openings with the inlet openings being in communication with an annular space around the filter element and an end space disposed proximate the closed end of the filter element. A coil spring is disposed between the end of the housing and the closed end of the filter element and is in contact with unfiltered oil flowing in the annular space and in the end space. The coil spring is magnetized to attract and retain magnetizable particles entrained in the stream of liquid prior to the stream of liquid passing through the filter media. While all of the lubricating oil which passes per unit time through the inlets to the filter assembly is not exposed to the magnetized coil spring, over a period of time the entire volume of oil being filtered does pass through the end space and is exposed to the magnetized coil spring. Consequently, most of the magnetizable particles in the lubricating are removed by magnetic adherence on the magnetized coil spring. When the filter assembly is disposed of the magnetizable particles captured on the coil spring are also disposed of.

BRIEF DESCRIPTION OF THE DRAWINGS

Various other features and attendant advantages of the present invention will be more fully appreciated as the same becomes better understood when considered in conjunction with the accompanying drawing, in which like reference characters designate the same or similar parts throughout the several views, and wherein.

DETAILED DESCRIPTION

Figure 2:
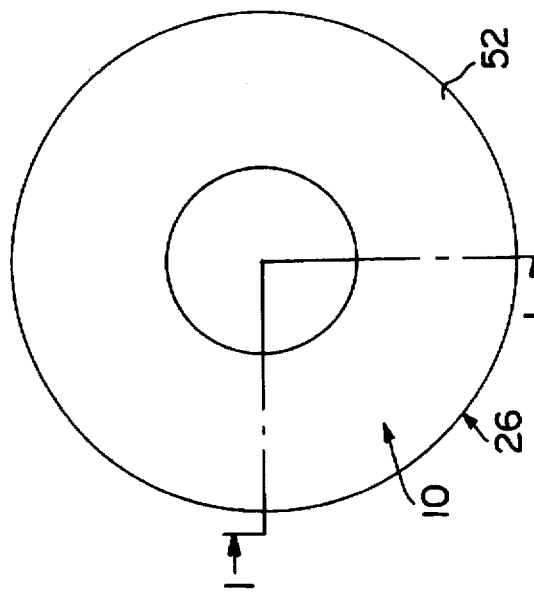
FIG. 2 is a top view of the filter assembly of FIG. 1.
Figure 3:
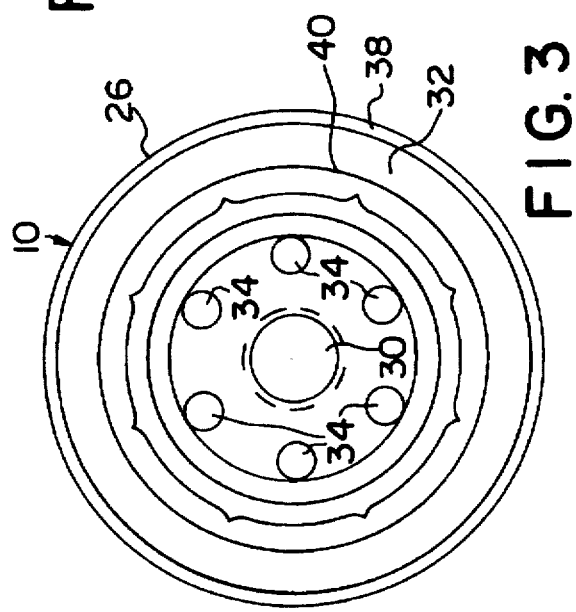
FIG. 3 is a bottom view of the filter assembly of FIG. 1.
Figure 1:
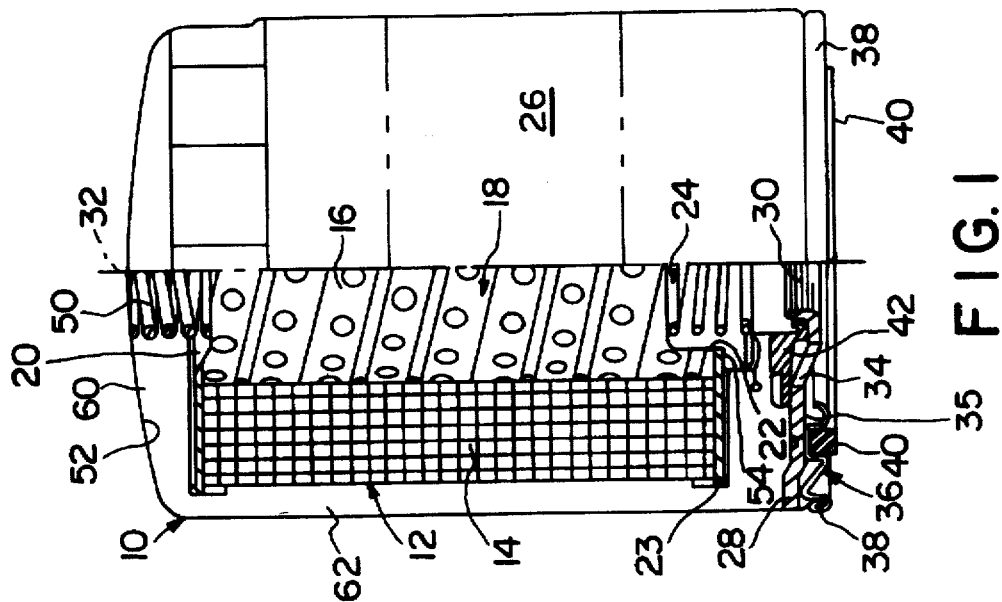
FIG. 1 is a side view, partially in elevation, showing the components of a filter assembly configured in accordance with the principles of the present invention.

Referring now to the drawings, there is shown a spin-on filter assembly 10 for filtering lubricating oil circulating in an internal combustion engine. The spin-on filter assembly 10 includes a filter element 12 which is comprised of an annular filter media 14 disposed around a perforated core sleeve 16 so as to define a hollow core 18, which hollow core 18 is closed by a disked end cap 20 and has an open end 22 surrounded by an annular end cap 23 in which is disposed a relief valve 24. The filter assembly 12 is contained within a container 26 which is enclosed by having end plate 28. The housing end plate 28 includes a threaded outlet opening 30 which is coaxial with the axis 32 of the filter assembly 10 and a plurality of spaced inlet openings 34 which are disposed around the threaded outlet opening. Over the outer surface 35 of the housing end plate 28 is a cover 36 which is crimped at a crimp 38 to the housing 26. The cover plate 36 has a gasket 40 for sealing with the base (not shown) on the internal combustion engine (not shown) to which the spin-on filter assembly 10 is secured. In order to retain the filter element 12 and relief valve assembly 24 tightly in the housing 26, a coil spring 50 is disposed between a closed end 52 of the housing and the first end plate 20 of the filter assembly. The coil spring 50 urges the filter element 12 against an annular shoulder 54 of the relief valve assembly 24 which in turn urges the relief valve assembly 24 against the anti-drain back valve 42, which in turn is pressed against the end plate 28.

In accordance with the principles of the present invention, the spring 50 is made of steel and is highly magnetized so as to have a higher degree of magnetization than any other component of the filter assembly. The spring 50 is the only element in the entire spin-on filter assembly 10 which is magnetized although its magnetic field also results in slight magnetization of adjacent portions of the filter assembly such as the closed end 52 of the housing 26 and the end cap 20 of the filter element 12.

The coil spring 50 is disposed in an end space 60 within the container 26 which is in communication with an annular space 62 that is in turn in communication with the inlet openings 34 through the base plate 28. Consequently, the only lubricating oil exposed to the magnetic field of the coil spring 50 is unfiltered oil. The coil spring 50 therefore attracts magnetizable particles in the stream of lubricating oil before those particles pass through the filter media 14 and into the central core 18 for recirculation through the outlet 30 back to the internal combustion engine (not shown).

Since the coil spring 50 is disposed out of proximity with the filter media 14 and is sealed therefrom by the end plate 20, large accumulations of magnetic particles are not disposed adjacent the pleats the filter media where they might become dislodged by flow surges and mechanical impulses so as to be pulled against, and perhaps through the filter media.

By magnetizing only the coil spring 50, it is not necessary to disrupt in any way the assembly procedures required to configure the filter assembly 10, and it is possible to place a very strong magnet within the stream of unfiltered oil without altering in any way the mechanical structure of the filter assembly.

Since magnetizable particles may accumulate in clumps, it is preferable to avoid having those clumps downstream of the filter media 14 because if a dump is dislodged, it will in all likelihood do greater damage to the engine than a separated entrained particles which, by themselves, may do little or no damage at all. Consequently, it is preferable to isolate accumulations of particles from the downstream side of the filter. Moreover, the velocity of lubricating oil in the end space 60 tends to be less than the velocity of lubricating oil in the annular space 62 so that the chances of a clump of magnetized material being dislodged is lessened.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a filter assembly including a cylindrical filter element having an annular filter media closed at one end by an end cap and having a hollow core opened at the other end, wherein the filter element is disposed within a filter container in annular spaced relation to an annular side wall and round end wall to define an annular space and an end space, an end plate disposed in the housing, the end plate having an outlet opening coaxial with the hollow core and inlet openings disposed in spaced relation around the outlet opening and in communication with the annular space and end space, wherein unfiltered liquid enters the inlet openings and flows into the annular space and end space before passing radially through the filter media to the hollow core and thereafter out of the outlet opening, the improvement comprising:

a coil spring of magnetized material disposed in the end space between the end cap of the filter assembly and round end wall of the housing for both urging the filter element toward the end plate to stabilize the filter element and for removing particles of magnetizable material suspended in the liquid therefrom by retaining the particles thereon so that the particles are disposed of when the filter assembly is disposed of, wherein the coil spring has a higher degree of magnetization than any other component of the assembly and wherein the coil spring stores captured particles in the end space at a location remote from the filter media.

2. The improvement of claim 1, wherein the outlet is an internally threaded outlet and the filter assembly is a spin-on type filter assembly.

3. The improvement of claim 2, wherein the filter media is fabricated for the purpose of removing particulate matter from engine lubricating oil.

4. The improvement of claim 3, wherein the filter element is coaxial with a relief valve assembly, which relief valve assembly has a first portion received within the hollow core of the filter element and a second portion which is urged by the bias of the magnetized coil spring into engagement with the end plate within the container.

5. The improvement of claim 4, wherein the relief valve assembly engages an anti-drain back valve disposed coaxially with respect to the outlet opening through the end plate.

6. A filter assembly for treating a liquid stream circulating therethrough comprising:

a cylindrical filter element including an annular filter media having a hollow central core and an end cap closing one end of the core and sealing one end of the filter media;

a filter container having a cylindrical side wall, a round end wall and an open end, the filter element being mounted in the filter container with an annular space between the filter element and cylindrical side wall and an end space between the round end wall of the container and end cap of the filter element;

an end plate disposed at the open end of the housing, the end plate having a central outlet in communication with the hollow core and spaced inlets in communication with the annular space between the filter element and closed end of the housing;

a single coil spring of magnetized material in the end space for capturing and removing magnetizable particles from the liquid stream prior to the liquid passing through the filter media, wherein the coil spring has a higher degree of magnetization than any other component of the assembly and wherein the coil spring stores captured particles in the end space at a location axially and radially spaced from the filter media.

7. The filter assembly of claim 6, wherein the outlet is threaded and the filter assembly is a disposable spin-on filter assembly.

8. The filter assembly of claim 7, wherein the filter media is configured for filtering lubricating oil.

* * * * *